No. 719,748. PATENTED FEB. 3, 1903.
H. CLAYTON & H. BROWER.
POISON DISTRIBUTER.
APPLICATION FILED NOV. 20, 1901.
NO MODEL. 3 SHEETS—SHEET 1.
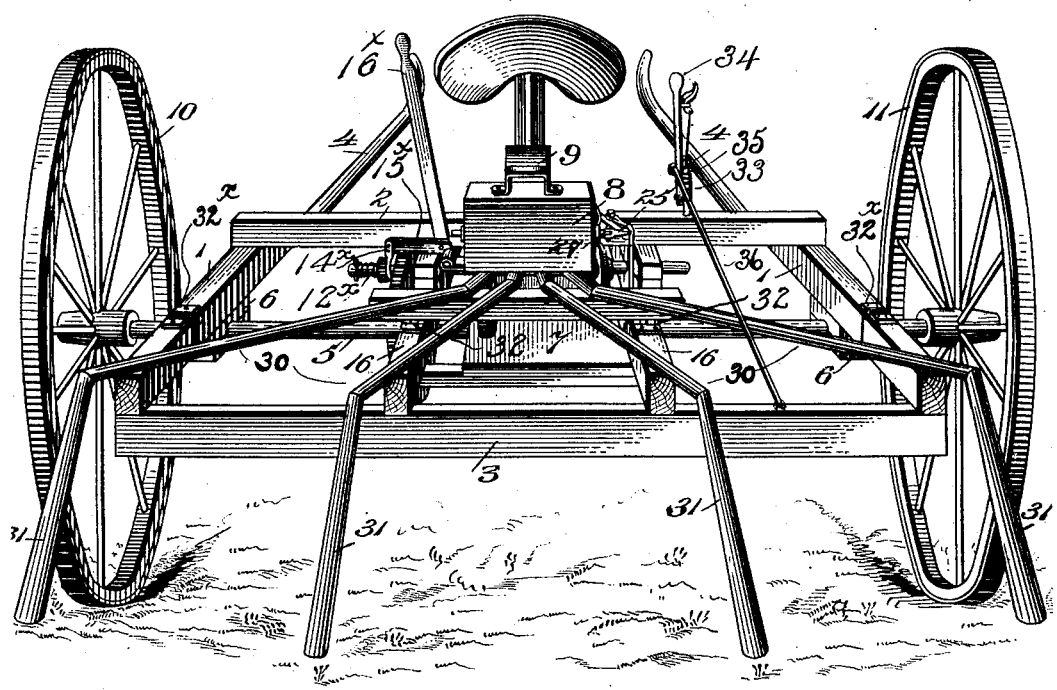
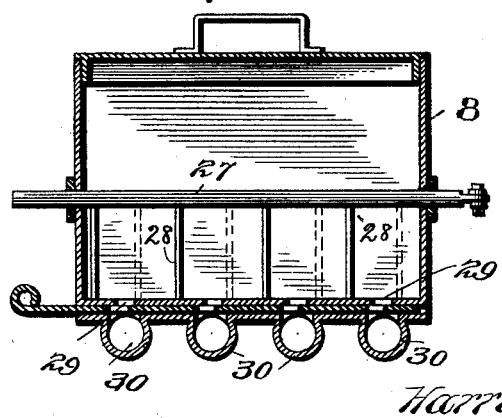

No. 719,748. PATENTED FEB. 3, 1903.
H. CLAYTON & H. BROWER.
POISON DISTRIBUTER.
APPLICATION FILED NOV. 20, 1901.
NO MODEL. 3 SHEETS—SHEET 2.
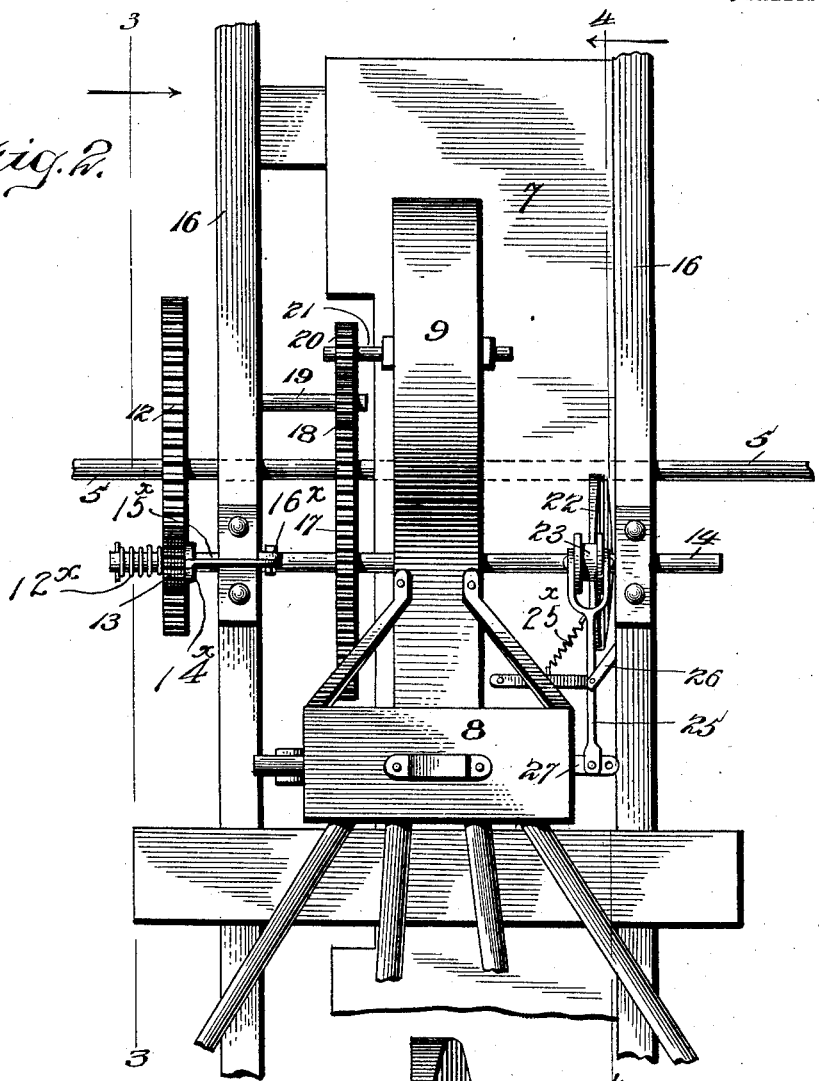
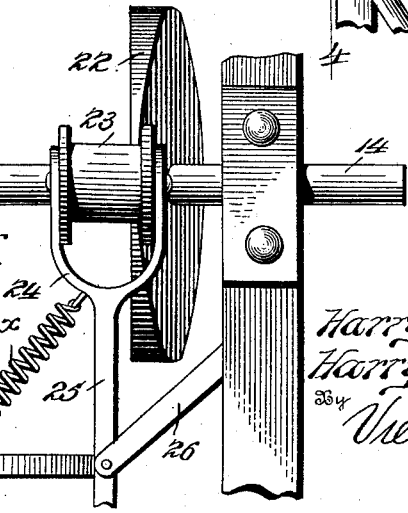
Witnesses
Inventors
Harry Clayton
Harry Brower
By Victor J. Evans
Attorney No. 719,748. PATENTED FEB. 3, 1903.
H. CLAYTON & H. BROWER.
POISON DISTRIBUTER.
APPLICATION FILED NOV. 20, 1901.
NO MODEL. 3 SHEETS—SHEET 3.

Witnesses
H. G. Dieterich
B. P. Funk

Inventors
Harry Clayton
Harry Brower
By Victor J. Evans
Attorney

UNITED STATES PATENT OFFICE.

HARRY CLAYTON AND HARRY BROWER, OF TURKEY, NEW JERSEY.

POISON-DISTRIBUTER.

SPECIFICATION forming part of Letters Patent No. 719,748, dated February 3, 1903.

Application filed November 20, 1901. Serial No. 83,027. (No model.)

*To all whom it may concern:*

Be it known that we, HARRY CLAYTON and HARRY BROWER, citizens of the United States, residing at Turkey, in the county of Monmouth and State of New Jersey, have invented certain new and useful Improvements in Poison-Distributers; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to the class of apparatus known as "poison-distributers" or machines for depositing poison in the form of powder upon growing plants to destroy injurious insects and vermin thereon.

The present invention is especially designed as a destroyer of potato-bugs and beetles, which attack potato-plants, although, of course, it may be employed for such other purposes as it may be found adapted for.

The invention consists of a machine mounted upon carrying-wheels and adapted to be drawn by a horse and having a receptacle for powder, a fan connected therewith, a plurality of discharge pipes or spouts for the powder-receptacle, means for revolving the fan to discharge the powder under the force of an air-current, and means for insuring the proper feed of the powder to the discharge-spouts.

The construction of the apparatus will be fully described hereinafter in connection with the accompanying drawings, which form part of this specification, and its novel features will be defined in the appended claims.

Figure 3:
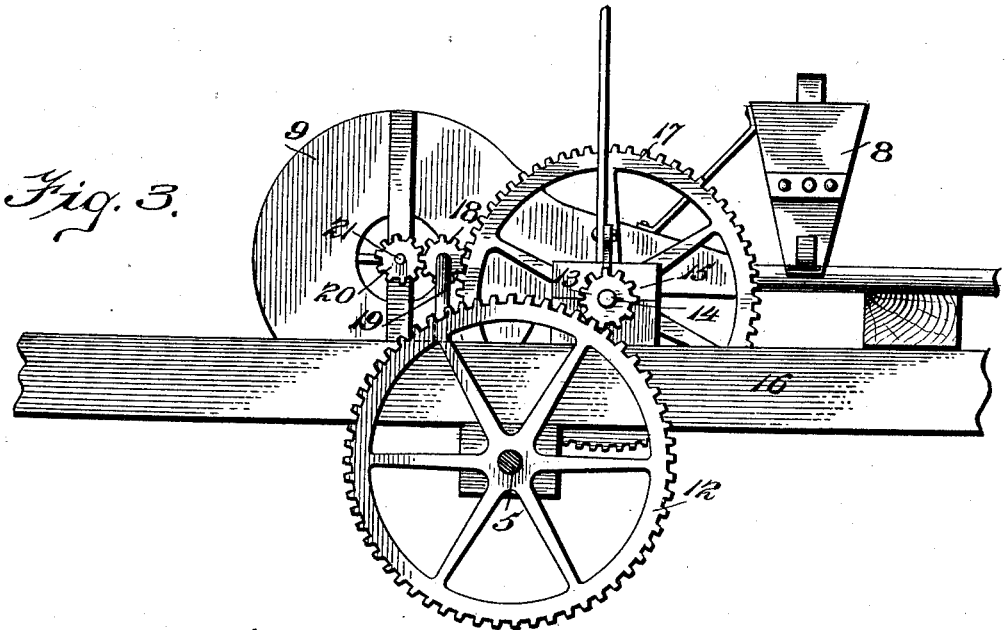
Figure 4:
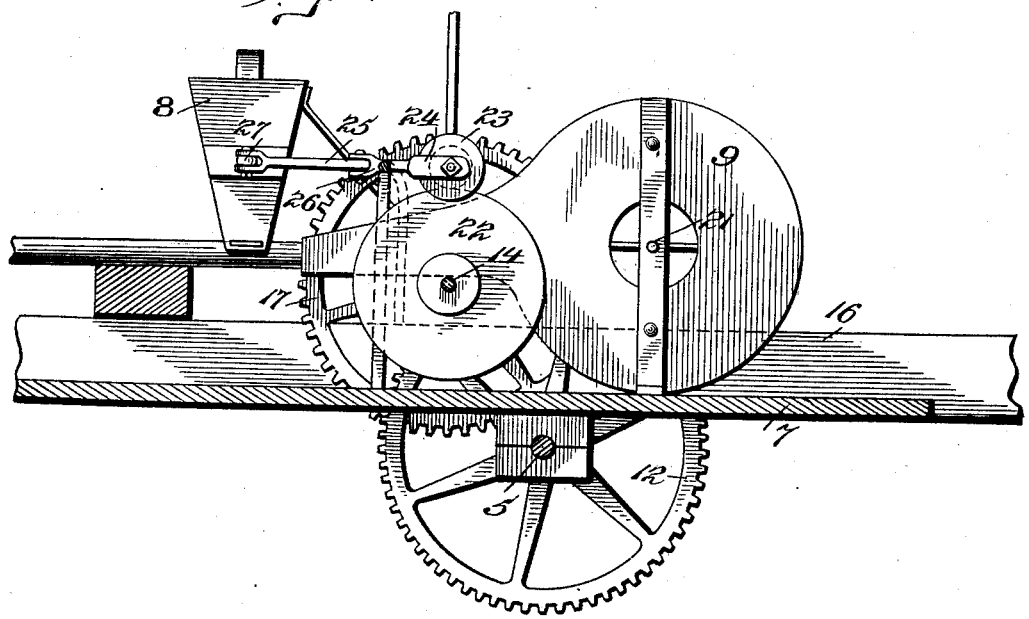

In the drawings, Figure 1 is a view in perspective of the machine looking from the rear thereof. Fig. 2 is a top plan view of the same with parts broken away. Fig. 3 is a section on the line 3 3 of Fig. 2. Fig. 4 is a section on the line 4 4 of Fig. 2. Fig. 5 is a vertical section of the powder box or receptacle; and Fig. 6 is a detail plan view, on an enlarged scale, of the cam for effecting the reciprocation of the scrapers or feeders within the receptacle.

The frame of the machine comprises parallel side bars 1, connected by cross-bars 2 and 3 and provided with a pair of shafts 4.

5 designates an axle supported in suitable bearings, as 6, on the side bars 1.

A platform 7, supported by the cross-bars of the frame, is provided, and suitably arranged upon this platform is a box or receptacle 8, a fan-casing 9, communicating with the box 8, and suitable gearing, which will be specifically described.

10 and 11 respectively designate the carrying-wheels of the machine, the left-hand wheel 10 constituting the drive-wheel. Upon the axle 5 is mounted a gear-wheel 12, meshing with a pinion 13, which is keyed to and slidably mounted upon a shaft 14, extending across the machine below the rear end of the fan-casing and supported in bearings 15 of the bars 16, which support the platform 7. This pinion 13 is held normally in mesh with the gear 12 by means of an expansive spiral spring $12^\times$, encircling and fastened to the shaft 14. Secured to the pinion 13 is an arm $14^\times$, which is connected by a link $15^\times$ to a hand operating-lever $16^\times$, by means of which, it may readily be seen, the pinion 13 may be forced against the spring $12^\times$ and out of engagement with the gear 12, thus disconnecting the various driven elements of the device from the driving means. Upon the shaft 14 is also mounted a gear-wheel 17, meshing with a pinion 18, mounted upon a stud-shaft 19 and in turn meshing with a pinion 20, mounted upon the projecting end of the fan-shaft 21, upon which are secured a plurality of blades within the casing.

Upon the shaft 14, at the right-hand side of the fan-casing, is mounted a cam-wheel 22, the periphery of which contacts with the flanged roller 23, mounted upon a suitable axial support in a yoke 24, projecting from the front end of a lever 25, fulcrumed upon a bracket-arm 26 and extending rearward for attachment to a bar 27, extending transversely through the box 8. When the cam-wheel 22 is rotated, its enlarged portion at intervals engages the flange of the roller 23 and moves the said roller and lever upon which it is journaled outwardly. Secured to the lever 25 and a suitable support on the frame of the machine is a spiral spring $25^\times$, the purpose and tendency of which is to draw the lever 25 inwardly after the enlarged portion of the cam-wheel has become disengaged from the roller, thus insuring a reciprocatory movement to the bar 27, to which the lever is connected. From the rear bar 27 depend a plurality of plates, serving as scrapers to direct the powder contained within the box to the discharge-openings 29 in the bottom of the box. These openings communicate with the forward end of a series of diverging pipes 30, formed with funnel-shaped downwardly-extending ends 31.

The rear ends of the bars 16 are hinged at 32, as are also the side bars 1 of the supporting-frame, as shown at $32^\times$. On the forward end of the cross-bar 2 is a segmental rack 33, on which is pivoted a hand-lever 34, carrying a dog 35 to mesh with the rack, whereby the lever may be held in position between the limits of its adjustment. This lever is connected to the cross-bar 3 by a link-rod 36. The lever is so arranged with relation to the seat that the driver may readily elevate the rear portion of the machine by pushing the lever forward. Inasmuch as the pipes 30 are flexible, the discharge ends 31 may be raised above the ground, thus obviating the liability of said ends becoming broken or otherwise damaged due to contact with rocks or other obstructions in the path of the machine.

We claim—

1. In a poison-distributer, the combination with the supporting-frame, of a poison-receptacle, a plurality of discharge-pipes leading therefrom, reciprocating feeding devices within the receptacle, a lever having one end in engagement with the feeding devices and the opposite end provided with a flanged roller, a cam engaging the roller and the flanges thereon to move the feeding devices in one direction, means independent of the cam to move the feeding devices in the other direction, and means to actuate the cam.

2. In a poison-distributer, the combination with the supporting-frame, of a poison-receptacle, a plurality of pipes leading therefrom, reciprocatory feeding devices within the receptacle, a lever having one end in engagement with the feeding devices and the opposite end formed with a yoke, a roller provided with peripheral flanges at its ends journaled in the yoke, a cam engaging the roller and the inner faces of its flanges to move the feeding devices in one direction, a spring to move the feeding devices in the other direction, and means to actuate the cam.

3. In a poison-distributer, the combination with the axle carrying the driving-gear and the supporting-frame, of a poison-receptacle, discharge-pipes communicating with said receptacle, a slide-valve in the receptacle to regulate the flow of poison to the discharge-pipes, reciprocating feeding devices in the receptacle, a bracket on the supporting-frame, a lever fulcrumed on the bracket, one end of said lever being connected to the feeding devices and the other end being provided with a yoke, a roller journaled in the yoke, the ends of said roller being provided with peripheral flanges, a spring secured at one end to the lever at the end carrying the yoke, and at the other end to the bracket, a transverse shaft journaled on the supporting-frame, said shaft being longitudinally slidable in its bearings and carrying at one end a pinion normally in mesh with the driving-gear, and at the other end a rotary cam which engages the said roller and its flanges to actuate the feeding devices, and a lever to slide the shaft in its bearings.

In testimony whereof we affix our signatures in presence of two witnesses.

HARRY CLAYTON.
HARRY BROWER.

Witnesses:
JOHN W. CONINE,
WM. C. BROWER.